(12) United States Patent
Koithan et al.

(10) Patent No.: US 7,264,050 B2
(45) Date of Patent: *Sep. 4, 2007

(54) METHOD AND APPARATUS FOR CONTROLLING WELLBORE EQUIPMENT

(75) Inventors: Thomas Koithan, Houston, TX (US); David Haugen, League City, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 10/936,438

(22) Filed: Sep. 8, 2004

(65) Prior Publication Data

US 2005/0096846 A1 May 5, 2005

Related U.S. Application Data

(63) Continuation-in-part of application No. 10/360,547, filed on Feb. 6, 2003, now Pat. No. 6,896,055, and a continuation-in-part of application No. 09/668,785, filed on Sep. 22, 2000.

(51) Int. Cl.
*E21B 47/00* (2006.01)
(52) U.S. Cl. .................. 166/250.15; 166/53
(58) Field of Classification Search ........... 166/250.15, 166/250.01, 53; 175/24, 40, 45
See application file for complete search history.

(56) References Cited

U.S. PATENT DOCUMENTS

| RE34,063 | E | 9/1992 | Vincent et al. |
|---|---|---|---|
| 5,289,372 | A | 2/1994 | Guthrie et al. |
| 5,416,697 | A | 5/1995 | Goodman |
| 5,463,549 | A | 10/1995 | Dussan et al. |
| 5,499,357 | A | 3/1996 | Sonty et al. |
| 5,504,491 | A | 4/1996 | Chapman |
| 5,721,538 | A | 2/1998 | Tubel et al. |
| 5,730,219 | A | 3/1998 | Tubel et al. |
| 5,868,201 | A | 2/1999 | Bussear et al. |
| 5,955,666 | A | 9/1999 | Mullins |
| 5,960,411 | A | 9/1999 | Hartman et al. |

(Continued)

FOREIGN PATENT DOCUMENTS

EP 0 801 354 A2 10/1997

(Continued)

OTHER PUBLICATIONS

D. Murray, D. Montgomery, and F. Florence, Risk Mitigation Technique for Advanced Rig Control Systems, IADC/SPE 72329, XP-002357906, IADC/SPE Middle East Drilling Technology, 2001.

(Continued)

*Primary Examiner*—William Neuder
(74) *Attorney, Agent, or Firm*—Patterson & Sheridan, L.L.P.

(57) ABSTRACT

The present invention generally provides a method for remotely controlling and/or monitoring at least one parameter of well bore equipment. In one aspect, a method for remotely controlling and/or monitoring at least one parameter of well bore equipment is provided, including: collecting data corresponding to the at least one parameter by a sensor module monitoring the at least one parameter of the well bore equipment; transmitting the collected data to a remote control/monitoring unit via a communication link; analyzing the collected data to determine if the parameter is within predefined limits; if the parameter is not within predefined limits, then transmitting control data from the control/monitoring unit to the well bore equipment for modifying the operation of the well operation equipment so that the parameter will conform to the predefined limits or stopping operation of the wellbore equipment.

35 Claims, 4 Drawing Sheets

U.S. PATENT DOCUMENTS

| | | | |
|---|---|---|---|
| 5,963,743 | A | 10/1999 | Amberg et al. |
| 6,029,141 | A | 2/2000 | Bezos et al. |
| 6,101,445 | A | 8/2000 | Alvarado et al. |
| 6,405,135 | B1 | 6/2002 | Adriany et al. |
| 6,491,828 | B1 | 12/2002 | Sivavec et al. |
| 6,531,694 | B2 | 3/2003 | Tubel et al. |
| 6,766,854 | B2 | 7/2004 | Ciglenec et al. |
| 6,896,055 | B2 * | 5/2005 | Koithan .................. 166/250.15 |
| 2002/0121012 | A1 | 9/2002 | Murakami et al. |
| 2002/0129139 | A1 | 9/2002 | Ramesh |
| 2003/0094281 | A1 | 5/2003 | Tubel et al. |
| 2004/0065439 | A1 | 4/2004 | Tubel et al. |
| 2004/0154832 | A1 | 8/2004 | Koithan |

FOREIGN PATENT DOCUMENTS

| | | |
|---|---|---|
| EP | 0 825 506 A2 | 2/1998 |
| EP | 1 445 419 | 8/2004 |
| GB | 2 247 904 | 3/1992 |
| WO | 98/50681 | 11/1998 |
| WO | WO99/35585 | 7/1999 |
| WO | WO 02/25319 | 3/2002 |

OTHER PUBLICATIONS

Bryce Levett, Improved Safety of Rig Automation with Remote Monitoring and Diagnostics, SPE 86600, XP-002357907, Society of Petroleum Engineers Inc., 2004.

EP Search Report, Application No. 05019284.8-2315, dated Dec. 22, 2005.

EP Search Report, Application No. 04250651.9-2315, dated May 25, 2004.

PCT International Search Report, Int'l App. No. PCT/GB 01/04140, dated Sep. 22, 2000.

U.S. Appl. No. 09/668,785, filed Sep. 22, 2000.

CA Office Action, U.S. Appl. No. 2,457,078, dated Dec. 12, 2006.

* cited by examiner

METHOD AND APPARATUS FOR CONTROLLING WELLBORE EQUIPMENT

CROSS-REFERENCE TO RELATED APPLICATIONS

This application is a continuation-in-part of U.S. patent application Ser. No. 10/360,547, filed Feb. 6, 2003 now U.S. Pat. No. 6,896,055.

This application is a continuation-in-part of co-pending U.S. patent application Ser. No. 09/668,785, filed Sep. 22, 2000, which is hereby incorporated by reference in its entirety to the extent that it does not conflict with the express teachings contained herein.

BACKGROUND OF THE INVENTION

1. Field of the Invention

This invention relates to a method and an apparatus for remotely controlling and/or monitoring well bore equipment arranged at oil or gas wells, and relate more particularly but not exclusively to a method for remotely controlling and/or monitoring at least one parameter of preferably mechanized well bore equipment arranged at oil or gas wells and to a rig control and monitoring system.

2. Description of the Related Art

An oil or gas well includes a well bore extending from the surface of the earth to some depth therebelow. For completion and operation of different wells, different equipment is sometimes necessary within the well bore and at the surface of the well. Such equipment is used for drill pipe handling, pressure control, tubing work, casing handling, and well installation. Traditionally, such equipment has been manually operated. Currently, the industry trend is toward mechanization and automation of such equipment where possible.

For example, mechanized rig systems improve rig flow operations by helping operators install tubing, casing, and control pipe more safely and efficiently during demanding drilling operations. Such a mechanized rig system reduces the time needed for pipe handling, make-up and break out of pipe connections.

Other mechanized equipment for well bores provides efficient means of automatic tubular handling and running. Other mechanized well bore equipment includes tongs, like tubing tongs, basing tongs, fiberglass pipe tongs, and drill pipe tongs for making up tubular connections. There are also tongs used in systems for placing a predetermined torque on a connection as well as tongs having independent rotation devices disposed therein. Additionally, some tongs include maneuvering devices that may be rail mounted are designed to suspend casing, tubing or drill type tongs from a frame.

In addition to the foregoing description, devices are routinely further automated and mechanized through the use of sensors for controlling and monitoring equipment and also for monitoring parameters of such equipment, like temperature, pressure, fluid flow, and torque, for example.

According to known methods for controlling and/or monitoring such a parameter, a corresponding sensor is generally connected to a measuring device which is part of or at least directly connected to some kind of computer terminal. The data from the sensor is transmitted to such measuring device and from this to the computer terminal. The measuring device comprises for example, a micro controller with customized software that may be used for collecting the data from the sensor and to transmitting it to the computer terminal. At the computer terminal, the data is processed and then displayed as a graphical display, like a bar graph, for example.

As computer terminals and measuring devices are arranged quite close to the corresponding sensor, the personnel operating the computer terminal are also necessarily working quite close to the sensor, and therefore, to the well bore or corresponding equipment of the well. Dangerous conditions arise because of possible contact with the different mechanized equipment. It is also an atmosphere that makes it difficult for personnel to work with high concentration because of exposure of the personnel to weather, noise, etc. present at the well.

Moreover, there are strict requirements for the use of such devices near a well bore, as they typically have to be integrated within a sealed enclosure, or "explosion proof," or they have to be purged with cooled, circulating air to keep the electronic components cool for more reliable operation.

Furthermore, the corresponding computer terminal used for evaluating the data collected from the sensors is typically some distance from the mechanized well bore equipment or the other equipment of the well whose parameters are monitored. Consequently, the result of the evaluation of the data is not directly useable for controlling and adjusting the equipment, and a separate communication channel is necessary, like a phone call or even by voices raised above the level of background noise.

Thus, it may take some time to control or adjust the equipment in reaction of the evaluation of the collected data, which may cause an interruption in well operations.

It is therefore an object of the invention to improve the corresponding method and also rig control and monitoring system such that it is possible to remove personnel from the equipment at the well to improve safety and also to render possible fast responses or reactions of the equipment based on the evaluation of the collected data without interruption of the working process.

SUMMARY OF THE INVENTION

One aspect of the present invention is a method for remotely controlling and/or monitoring at least one parameter of well bore equipment comprising: collecting data corresponding to the at least one parameter by a sensor module monitoring the at least one parameter of the well bore equipment: transmitting the collected data to a remote control/monitoring unit via a communication link; analyzing the collected data to determine if the parameter is within predefined limits; if the parameter is not within predefined limits, then transmitting control data from the control/monitoring unit to the well bore equipment for modifying the operation of the well operation equipment so that the parameter will conform to the predefined limits or stopping operation of the wellbore equipment.

According to another aspect of the invention, a rig control and monitoring system comprises at least one piece of mechanized well bore equipment, comprising a sensor module; a remote control/monitoring unit connected with the well bore equipment by a communication link, wherein the control/monitoring unit comprises a display means and/or a storage means.

BRIEF DESCRIPTION OF THE DRAWINGS

So that the manner in which the above recited features of the present invention can be understood in detail, a more particular description of the invention, briefly summarized

DETAILED DESCRIPTION OF THE PREFERRED EMBODIMENT

Figure 1:
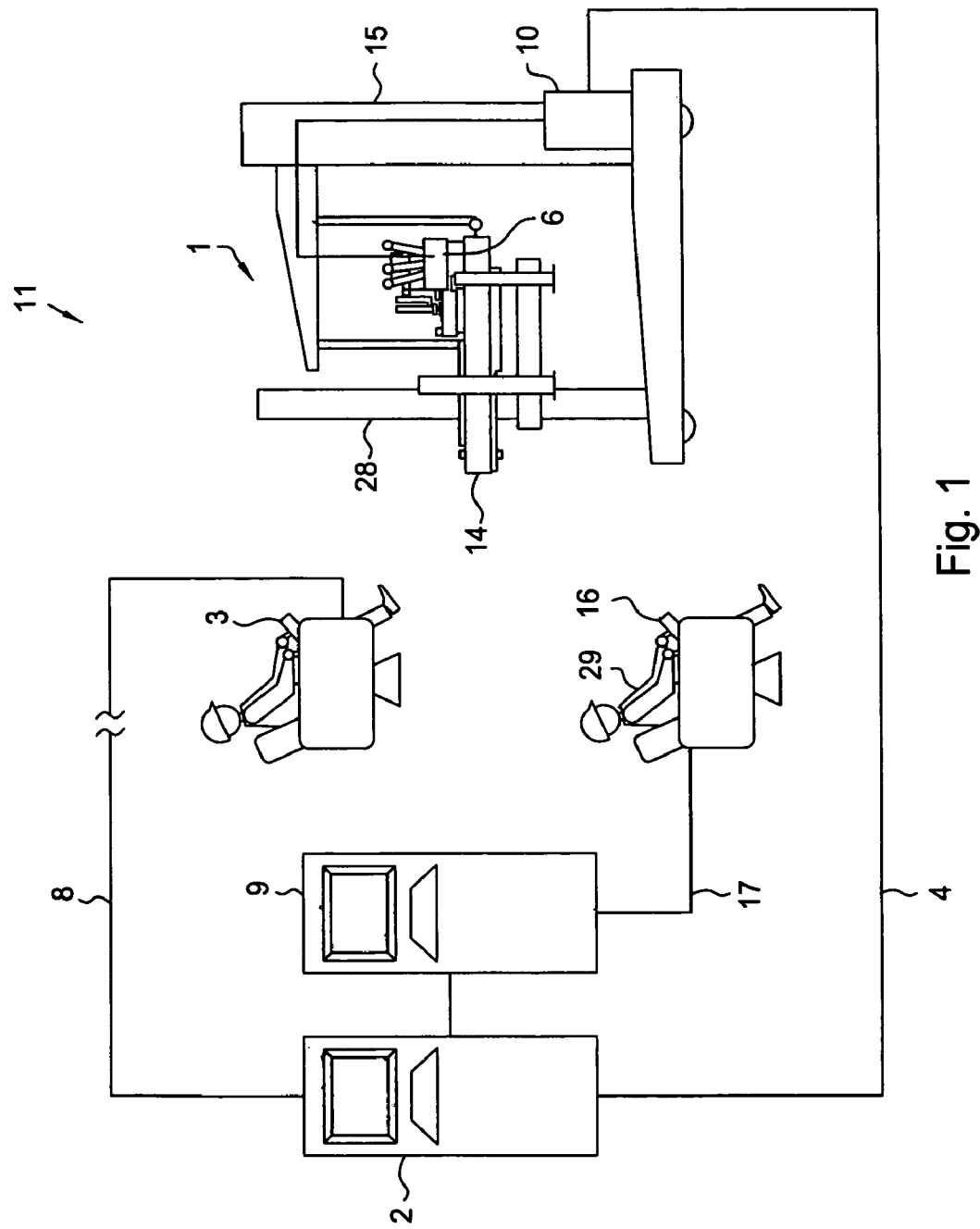
FIG. 1 is a view of a rig control and monitoring system.

In the present invention FIG. 1 is a view of one embodiment of a rig control and monitoring system 11 according to the invention. The rig control and monitoring system 11 includes a piece of well bore equipment 1, which in turn includes a rig control system 15. Such a system 15 is typically used for operating a tong 14 which holds a tube or casing 28. One sensor module 6 is assigned to this system 15. The corresponding parameters monitored by the sensor module 6 are typically torque and turns.

One example for a system used for data collection by the sensor module or modules 6 is a torque—turn and torque—time monitoring means and in particular a joint analyzed make-up (JAM) system, available from Weatherford International of Houston, Tex., for monitoring torque, turns, elapsed time and numbers of rotation of a tong. By such a joint analyzed make-up system, it should be insured that all tubing and casing connections conform to the most exacting manufacturers' specifications. The joint analyzed make-up system can visualize the slightest damage to threaded connections to avoid make-up problems. In the particular case of a JAM monitoring system as a sensor module 6, a load cell for torque measuring and a turn counter may transmit data to a universal data acquisition and control system 2 as a generalized measuring device.

The sensor module 6 may also be assigned to any kind of equipment used at a gas or oil well like tubing or casing tongs, drill pipe tongs, remotely operated tongs, tong positioning systems, make-up and break out tools, systems for automatic tubular handling and running, connection leak detection systems, slips, spiders, pressure control equipment, packers, etc. The parameter monitored by the corresponding sensor module may be for example, torque, number of turns, elapsed time, pressure, temperature, flow, etc. The sensor module 6 may also be adapted to detect a leak of the tubing or casing or any other part of the equipment.

The rig control system 15 is normally used to improve the rig operations for installing tubing, casing, drill tools, and string make-up. Such rig control system 15 allows the running of tubulars without exposing personnel in the derrick to dangerous conditions. The rig control system 15 may include mechanized components, such as a Power Frame™ available from Weatherford International, or a Torq Winder™, also available from Weatherford International. The Power Frame™ is an automatic tubular handling and running, remotely controlled hydraulic rail-mounted system. The Torq Winder™ is a system which makes-up and breaks out drill pipe, drill collars, drill bits, stabilizers and bottom hole assemblies.

The data corresponding to the measured parameter is submitted by the sensor module 6 to an individual control means 10 assigned to the corresponding well bore equipment 1. It is also possible that the corresponding data is directly submitted by communication link 4 to the universal data acquisition and control system 2.

In FIG. 1, there is only one piece of well bore equipment 1 and one sensor module 6 assigned thereto. However, it is possible to provide multiple sensor modules 6 assigned to a single piece of well bore equipment 1 or to transmit data from multiple sensor modules 6 at different locations and assigned also to different pieces of well bore equipment 1. According to the invention, it is possible to collect data from sensor modules 6 from multiple locations and to transmit the data to the universal data acquisition and control system 2. The different sensor modules 6 at the multiple locations may be the same sensor modules used for example, for measuring pressure.

The communication link 4 may be a wire transmission link or a field bus link. Examples for such a field bus are Profibus, Interbus, CANBus, LightBus or even other communication links as RS232 or RS485 or others. In case the sensor module 6 is arranged far away from the universal data acquisition and control system 2 or in case it is difficult to connect sensor module and the system by some kind of hard wired connection, the data from the sensor module is advantageously transmitted to the universal data acquisition control system via a wireless transmission. In other cases, it may be advantageous to use a wire transmission for example, when there would be a number of interferences in view of a wireless transmission caused by other wireless transmissions used at the well. The communication link 4 to the sensor module 6 from the universal data acquisition and control unit 2 may also be any of the means described below for communication link 8.

One universal data acquisition and control system 2 suitable for use in this invention is a HiPer™ control system available from Weatherford, which is an operating platform suitable for all mechanized rig systems in which the corresponding components can be operated remotely by utilizing this system.

The applicant preferably uses the HiPer™ control system for operating mechanized rig and well bore equipment. This control system of the applicant may be used as the universal data acquisition and control system 2. In particular, this applicant's control system is already adapted for controlling and adjusting the operation of the corresponding equipment such that by the communication link to the control/monitoring unit, an immediate reaction and modifying or adjusting of the operation of the equipment is possible to maintain a corresponding parameter within defined limits.

For the communication link 8 between the universal data acquisition control system 2 and control/monitoring unit 3, a number of realizations are possible. One possibility is a bus transmission means with corresponding interfaces provided at the control system and at the unit. Examples for such bus transmission means are Ethernet, field bus, RS232, RS485, etc. A corresponding field bus may be for example a profibus, interbus, CAN bus, etc. In particular, if the communication link is realized by Ethernet, such a connection may be a TCP/IP connection. It is also possible to use a fiber optic transmission means. In the North Sea, for example, a corresponding fiber optic backbone can be used as such a fiber optic transmission means. A further possibility is a wireless transmission means as for example a radio transmission link which may also be realized by a satellite communication link. A common characteristic of such transmission means or communication links should be that they are high data rate communication links. For the transmission of the data any known type of modulation of the data may be used, as frequency modulation, amplitude modulation, etc. Moreover, it is advantageous when the communication links 4, 8 are fully duplexed such that data may be easily transmitted in both directions not only between sensor module 6 and data acquisition and control system 2, but also between control/monitoring unit 3 and the data acquisition and control system.

From the universal data acquisition and control system 2, the collected data is transmitted by the communication link 8 to the remote control/monitoring unit 3, which may be a distance from sensor module 6. For example, the operator may be located onshore when the well site is offshore. The remote control/monitoring unit 3 may be, for example, a laptop computer. This laptop 3 serves as a display unit and may also serve as an evaluation unit for the data received from the universal data acquisition and control system 2. The corresponding control/monitoring unit 3 may display, for example different graphs of torque/time and torque/turns may be displayed.

The corresponding sensor module 6 is not directly connected to the computer terminal or corresponding control/monitoring unit 3. Consequently, this terminal unit 3 can be arranged at any place relative to the corresponding sensor module 6, which means the unit may be arranged onshore and used for example for offshore wells. Also, the corresponding personnel can be located remotely from the well and all the equipment such that safety is increased. Additionally, work for the personnel is simplified as there is no longer a need to work in a noisy environment with exposure to the weather elements. Also, it is also no longer necessary to meet the strict requirements for devices arranged quite near to the well, as fireproof, intrinsically safe, explosion proof, etc.

Another advantage of the invention is that the universal data acquisition control system 2 may be connected to a plurality of sensor modules 6 for collecting corresponding data. Since the collected data is transmitted from the universal data acquisition control system 2 to the control/monitoring unit 3, there is no particular measuring device assigned to the unit or computer terminal 3, but there is a general and universal data acquisition and control system 2 used for collecting data from the corresponding sensor modules.

It is an advantage of the invention that corresponding sensor modules 6 of this system at different locations be served by only one control/monitoring unit 3 realized by a corresponding computer. The specific data collected from these sensor modules 6 from one location can be shared with the others in order to provide a complete make-up history at the well center. This enables the pre-assembly of pipe in stands at a mouse hole position and forwarding this stand to well center and also forwarding the corresponding JAM data as well to well center in order to track Tally numbering or Tally length control, wherein string length control is important for setting a packer.

It is of course possible that data from a plurality of sensor modules is displayed and/or stored by the control/monitoring unit 3 wherein the data may be displayed on one screen in different windows or in different pull-down windows or may also be displayed on different screens that have to be selected. Moreover, it is possible to link the data from different sensor modules 6 to obtain a more generalized overview of the corresponding equipment or of all equipment. All other data processing is also possible, as averaging, providing a history of the equipment etc.

The communication links 4, 8 are fully duplex, and it is also possible to transmit control data from the remote control/monitoring unit 3 to the universal data acquisition and control system 2. The control data may then be used by the universal data acquisition and control system 2 to modify or adjust well bore equipment 1 such that the parameter measured by sensor module 6 is within predefined limits or such control data may be used to stop the operation of the corresponding well bore equipment 1 in case it is not possible that the equipment may be controlled to keep the parameter within the predefined limits. The corresponding control data received by the universal data acquisition and control system 2 may be transmitted to a corresponding valve control block assigned to the corresponding well bore equipment 1 is operated via system 15 for control of tong speed and torque.

In some cases it may also be advantageous if the universal data acquisition and control system 2 provides an on-site access to the collected data or the received control data. By this on-site access, it is possible to check the data directly at the universal data acquisition and control system 2 or to change the received control data to influence the adjustment or modification of the operation of the equipment 1 that would otherwise be initialized by these control data received from the control/monitoring unit 3.

Another universal data acquisition and control system 9 may be connected to system 2 through a communication link 17, and may also be used to remotely control the well bore equipment 1 from another computer or laptop 16 wherein the corresponding operator is arranged offshore, i.e. on rig site. This operator directly controls the well bore equipment 1 and may also receive the control data from the remote control/monitoring unit 3 for adjusting his operation in response to the received control data. Alternatively, It possible to connect at least one more control/monitoring unit 3 to the universal data acquisition and control system 2, wherein this additional unit may be used as a back-up unit or to display the corresponding data to personnel at a different location.

The rig control system 15 may be a separate control system different from the universal data acquisition and control system 2 but also be used for receiving control data from the control/monitoring unit 3. It is also possible that the rig control system 15 is used as a separate universal data acquisition and control system 2. The good or bad make-up may then be immediately notified and forwarded to the rig control system 15 via the corresponding communication link such that no shouting, no phone calls are necessary as with a separate JAM-equipment not using universal data acquisition and control system 2 and corresponding communication links between same and the sensor module 6 and the control/monitoring unit 3. A further advantage of the invention is that the universal data acquisition and control system 2 or the separate control system 15 may be integrated on-site, i.e. rig's individual control means. By such an integration, the universal data acquisition and control system 2 or the separate control system 15 is arranged on a corresponding offshore rig.

Figure 2:
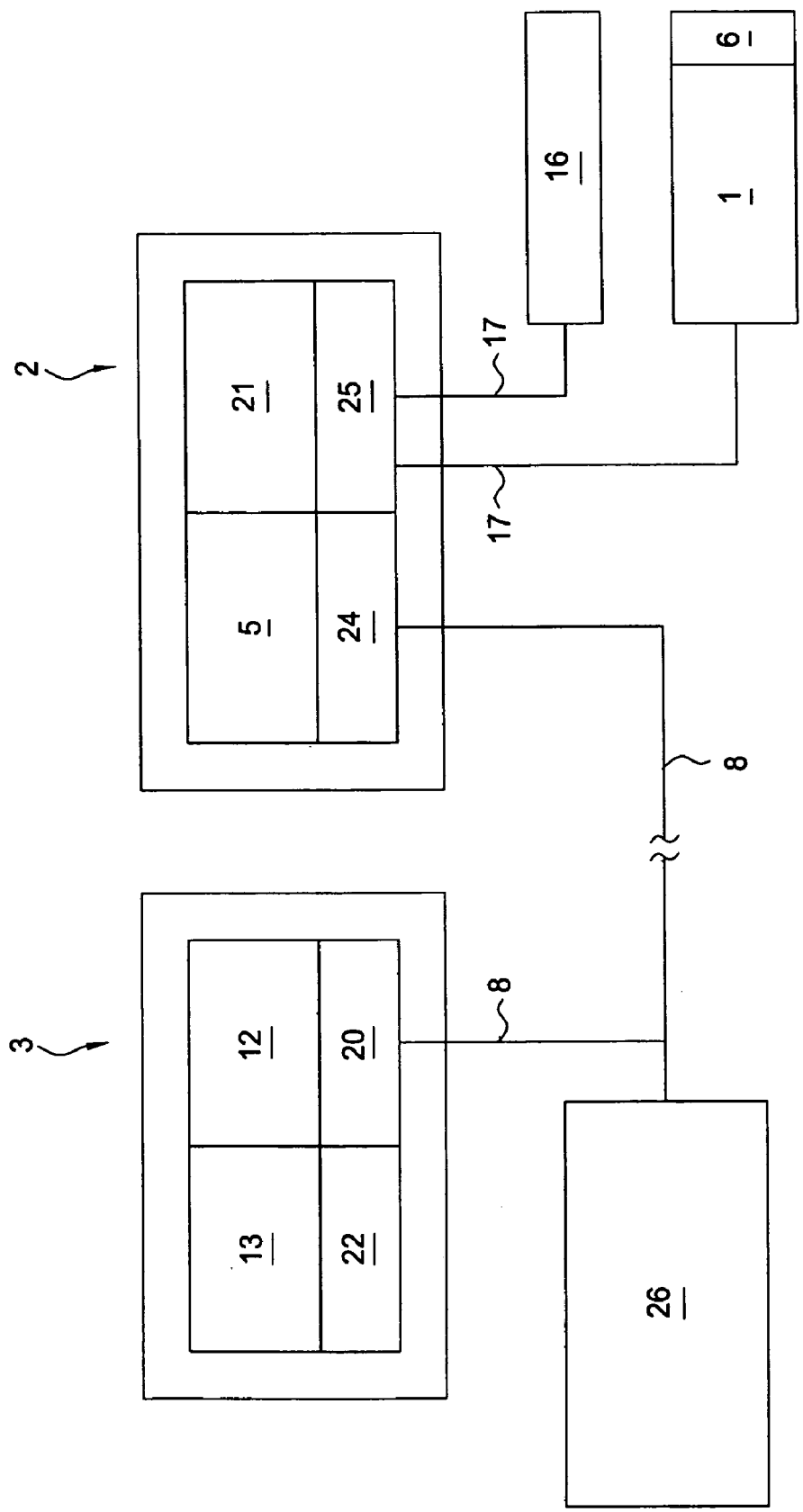
FIG. 2 is a view of a communication structure with corresponding communication links used according to FIG. 1.

FIG. 2 is a more detailed view of the communication structure used by the rig control and monitoring system 11 according to FIG. 1.

The universal data acquisition and control system 2 comprises for example a memory storage means 5 which may be used for immediate storage of data collected from one or more sensor modules 6. Of course, this memory storage means 5 may also be used for storing other data of the well bore equipment 1 or for storing control data received from the remote control/monitoring unit 3.

The universal data acquisition and control system 2 further comprises a programmable logic control device 21 and interfaces 24 and 25 for the corresponding communication links to the remote control/monitoring unit 3 and the sensor module 6 or well bore equipment 1 and further remote control means 16. The communication link between laptop 16 or sensor module 6/well bore equipment 1 and universal data acquisition and control system 2 is realized by a field bus 17 which may be a Profibus, Interbus, RS232, RS485 or others.

The other interface 24 is used for realizing the communication link to the remote control/monitoring unit 3 by Ethernet 8. As already said, it is also possible that this communication is a radio transmission via satellite, a fiber optic transmission, etc.

The remote control/monitoring unit 3 also comprises another interface 20 and further a display means 12 and a storage means 13. The display means 12 is used for visualizing the evaluated data received from the universal data acquisition and control system 2 as a graph, a table, etc. For evaluating the corresponding data, a corresponding evaluation module 22 is stored in the remote control/monitoring unit, wherein, the evaluation module 22 may be provided on any kind of at least readable storage means. The evaluation module 22 may evaluate the received data and display it as a graph, a table, or some other illustration. It is also possible that the evaluation module 22 is usable for more than one software module and also for different parameters. Independent of the sensor module 6 or the corresponding parameter, a second evaluation module may be loaded into the control/monitoring unit 3 wherein such evaluation module may be realized by software on a memory means readable by the unit.

In FIG. 2, there is not only an Ethernet communication link between universal data acquisition and control system 2 and the remote control/monitoring unit 3, but also between control system 2 and at least one further supervising means 26. This may be arranged at a different location and may be used for remote debugging, supervising, collecting data for maintenance, etc.

The corresponding or general communication link 8, such as Ethernet, between remote control/monitoring unit 3 and universal data acquisition and control system is also used for forwarding an interpretation of the data to the corresponding rig control system 15 or well bore equipment 1 such that it can be immediately decided if the parameters are in predefined limits.

According to the invention, it is in particular possible to remove personnel from the well bore or well center area on the rig without interruption of the operation of the well bore equipment due to safety reasons as there may be an intermediate response back from the remote control/monitoring unit 3 to the universal data acquisition and control system 2 and further to the corresponding well bore equipment 1 or rig control system 15. Consequently, there is not only real time data acquisition and evaluation according to the method of the invention but also real time operation of the corresponding well bore equipment or rig control system to react on the evaluation of the collected data.

Because of the plurality of sensor modules, the universal data acquisition and control system, additional control system, control/monitoring units, it is of advantage when all these devices are synchronized.

Furthermore, to provide the universal data acquisition and control system with more flexibility such that it may be used for different equipments at different locations or also for different equipment at the same location, it may comprise a programmable logic control means.

Figure 3:
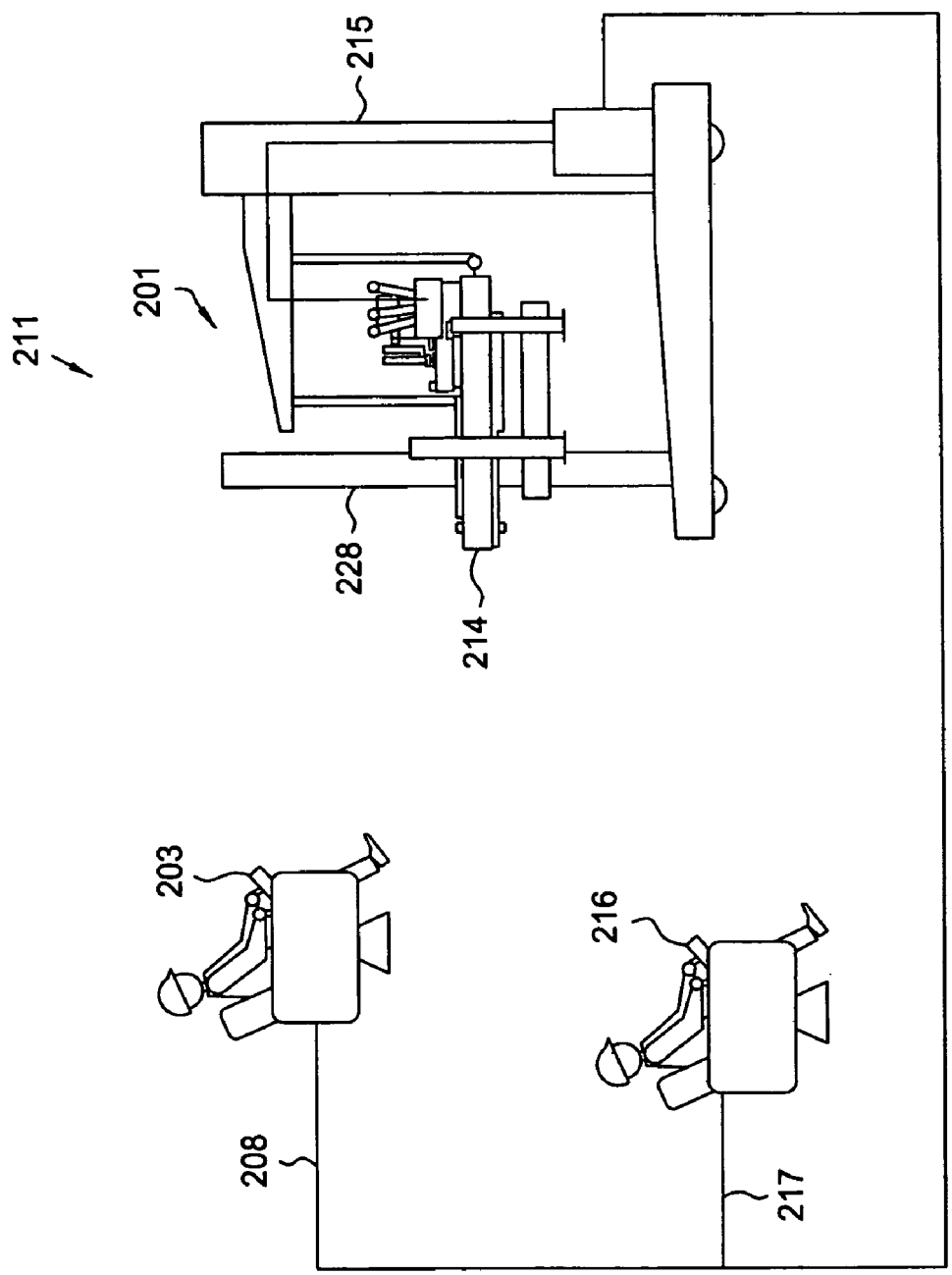
FIG. 3 illustrates an alternative embodiment of a rig control and monitoring system according to the present invention.

FIG. 3 illustrates an alternative embodiment of a rig control and monitoring system 211 according to the present invention. In this embodiment, the universal data acquisition and control systems 2,9 of the embodiment discussed with reference to FIGS. 1 and 2 have been omitted. The rig control and monitoring system 211 includes a piece of well bore equipment 201, for example, a Power Frame™, which is an automatic tubular handling and running, remotely controlled hydraulic rail-mounted system, available from Weatherford International of Houston, Tex., or a Torq Winder™, which makes-up and breaks out drill pipe, drill collars, drill bits, stabilizers and bottom hole assemblies, also available from Weatherford International. The piece of well bore equipment 201 may also include any kind of equipment used at a gas or oil well like tubing or casing tongs, drill pipe tongs, remotely operated tongs, tong positioning systems, make-up and break out tools, systems for automatic tubular handling and running, connection leak detection systems, slips, spiders, pressure control equipment, packers, etc. In FIG. 3, the well bore equipment 201 includes a tong 214 which holds a tube or casing 228.

The piece of well bore equipment 201 includes an individual control system 215, typically used for operating the well bore equipment 201. The individual control system 215 may include a valve control block (not shown) for control of tong speed and torque. The individual control system 215 further includes a sensor module 206, which in this case, is capable of monitoring torque and turns. The sensor module 206 may also be capable of monitoring elapsed time, pressure, temperature, flow, etc., depending on the type of well bore equipment 201 used. The sensor module may also be adapted to detect a leak of the tubing or casing or any other part of the equipment.

The data corresponding to the measured parameter is submitted from the sensor module to a remote control/monitoring unit 203 via a first communication link 208. The remote control/monitoring unit 203 may be located at a considerable distance from the piece of well bore equipment 1. For example, the operator may be located onshore when the well site is offshore. However, the remote control/monitoring unit may be also be located on-site relative to the piece of well bore equipment 1.

Optionally, the data corresponding to the measured parameter may also be submitted from the sensor module to a local control/monitoring unit 216 via a second communication link 217, especially if the remote control unit 203 is located off-site. The local control/monitoring unit 216 may be located proximate the piece of wellbore equipment 201 relative to the remote control/monitoring unit 203, and will usually be located on-site. The operator operating the local control/monitoring unit 216 may directly control the piece of well bore equipment 201 instead of the remote control/monitoring unit 203 having direct control. In that case, the local operator would receive the control data from the remote control/monitoring unit 203 and relay it to the individual control unit of the piece of well bore equipment 201.

Either of the control/monitoring units 203,216 may be integrated with other rig control systems (not shown). The remote control/monitoring unit 203 may be connected to many pieces of well bore equipment at a single site, multiple sites, or both.

The communication links 208, 217 may be hard wired or wireless. The communication links 208,217 may be realized by bus transmission means with corresponding interfaces provided at the individual control system 215 and at the respective control/monitoring units 203,229. Examples for such bus transmission means are Ethernet, field bus, RS232, RS485, etc. A corresponding field bus may be for example a profibus, interbus, CAN bus, etc. In particular, if the communication link is realized by Ethernet, such a connection may be a TCP/IP connection. Preferably, the communication links 208,217 are fully duplex and are capable of handling high data rates. The communication links 208,217 may also be realized by satellite or fiber optics.

The control/monitoring units 203,229 serve as a display unit and may also serve as an evaluation unit for the data received from the sensor 206. The control/monitoring units 203,229 may be computers, such as desktops or laptops. The computers may be running a software package, such as JAM (joint analyzed makeup) monitoring software, also available from Weatherford International. Such JAM software is used to monitor torque, turns and rotations per minute of the tong to ensure that all tubing and casing connections confirm to a manufacturer's specification. An operator at each of the control/monitoring units 203,229 may review the data from the sensor module 206. If the parameter measured by the sensor module 206 is not within predefined limits, then the respective operator may cause one of the control/monitoring units 203,229 to issue control data to the individual control system 215 which will then modify or adjust well bore equipment 201 such that the parameter will conform to the predefined limits. Alternatively, the respective operator may cause one of the control/monitoring units 203,229 to issue control data to the individual control system 215 which will then stop operation of the corresponding well bore equipment 201 if he determines it is not possible to control the equipment to keep the parameter within the predefined limits.

Figure 4:
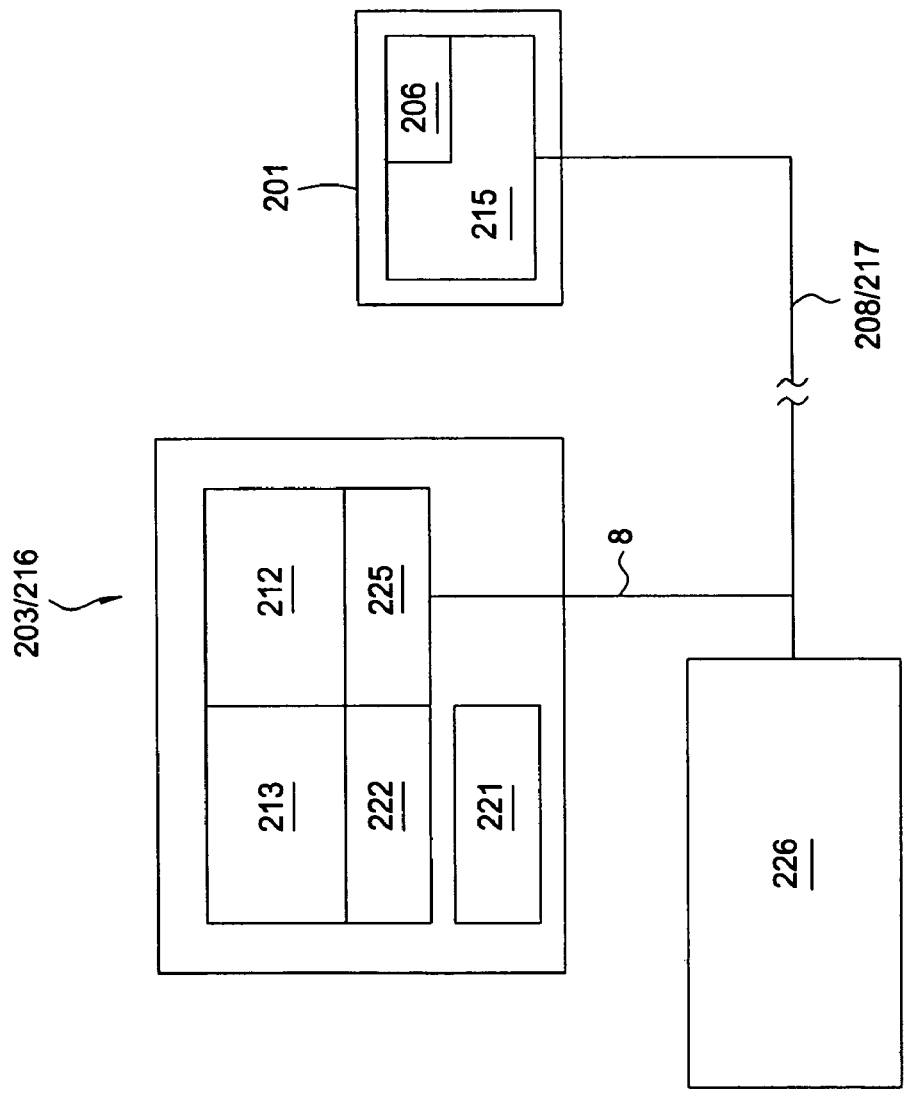
FIG. 4 is a more detailed view of the communication structure used by the rig control and monitoring system according to FIG. 3.

FIG. 4 is a more detailed view of the communication structure used by the rig control and monitoring system 11 according to FIG. 3. The control/monitoring units 203,229 may each comprise, for example, a storage means 213 which may be used for immediate storage of data collected from one or more sensor modules 206. This storage means 213 may also be used for storing other data of the well bore equipment 201 or for storing control data issued by a respective one of the control/monitoring units 203,229. The control/monitoring units 203,229 may each further comprise a programmable logic control device 221 and an interface 225 for the corresponding communication links to the piece of well bore equipment 201. The control/monitoring units 203,229 each also comprise display means 212, which may be used for visualizing the evaluated data received from the sensor 206 as a graph, a table, etc. For evaluating the corresponding data, a corresponding evaluation module 222 is stored in the control/monitoring unit, wherein, the evaluation module 222 may be provided on any kind of at least readable storage means.

The rig control and monitoring system 211 may further comprise at least one further supervising means 226. The supervising means 226 may be arranged at a different location and may be used for remote debugging, supervising, collecting data for maintenance, etc.

3-D Display

In addition to the display capabilities set forth above, information can be displayed in other useful ways, especially information related to operating variables of automated equipment on a rig floor. For example, utilizing the hardware and software described herein, it is possible to display items in a three dimensional format whereby variables like torque, turns, and time are independently illustrated along with their relationship to each other. Using this three dimensional format, it is also possible to dissect the image to give a snap shot of any one or two of the variables at any particular time. In this manner, the make up of a joint, for instance can be analysed at any time.

One obvious advantage of a having a three dimensional graph instead of three, independent graphs (Torque—Turn, Torque—time and RPM-turns) is that an operator has only to observe one graph instead of three. It is also possible to color code the graph to further simply the illustration and make it even easier to distinguishing between variables in the 3D image. Additionally, the coloring can be programmed whereby in the event of an error or bad condition, a portion of the graph representing the variable with the problem can become red in color, alerting an operator's attention to the condition. Additionally, with the design of the 3D graph display, the graph may be rotated in a way that brings one of the parameters into the foreground for more specific observation. In addition, when using a graph as the foregoing, energy (or pre-load) which is imparted into the connection may be calculated out of the volume under the graph, which could be another parameter for the evaluation of a connection.

Detecting Shoulder Condition

In another example, the applied torque and rotation in making up a shouldered tubular connection are measured at regular intervals throughout a pipe connection makeup. The rate of change of torque with rotation (derivative) is calculated for each set of measurements. These three values (torque, rotation and rate of change of torque) are then compared either continuously or at selected rotational positions, with minimum and maximum acceptable predetermined values, and a decision made whether to continue rotation or abort the makeup. Additionally, the derivative (rate of change of torque) is compared with predetermined threshold values to determine seal and shoulder contact points. The change in torque and rotation between these two detected contact points is checked to ensure that the change is within a predetermined acceptable range. When the shoulder contact is detected, a predetermined torque value and/or rotation value is added to the measured torque and/or rotation values, respectively, at shoulder contact and rotation continued until this calculated value(s) is reached. The application of torque is terminated and the reverse rotation of a tubing length is monitored as the connection relaxes. If the relaxation is within an acceptable predetermined range and the above conditions are met then the makeup is considered acceptable.

While the foregoing is directed to embodiments of the present invention, other and further embodiments of the invention may be devised without departing from the basic scope thereof, and the scope thereof is determined by the claims that follow.

The invention claimed is:

1. A method for remotely controlling and/or monitoring oil field tubular handling equipment at an oil or gas well, comprising:
    collecting data corresponding to at least one parameter selected from a group consisting of torque and turns by a sensor module monitoring operation of the oil field tubular handling equipment,
    transmitting the collected data to a remote control/monitoring unit via a communication link;
    analyzing the collected data to determine if the parameter is within predefined limits; and
    if the parameter is not within predefined limits, then transmitting control data from the remote control/monitoring unit to the oil field tubular handling equipment for modifying the operation of the oil field tubular handling equipment so that the parameter will conform to the predefined limits or stopping the operation of the oil field tubular handling equipment.

2. The method according to claim 1, further comprising storing the collected data in a storage means of the remote control/monitoring unit.

3. The method according to claim 1, wherein the communication link is wireless.

4. The method according to claim 1, wherein the communication link is a bus transmission means or fiber optic link.

5. The method according to claim 1, wherein data collected from sensor modules at multiple locations is transmitted to the remote control/monitoring unit.

6. The method according to claim 5, wherein the data is stored from all sensor modules to provide a complete make-up history of all well bore equipment.

7. The method according to claim 1, wherein the remote control/monitoring unit is located on-site relative to the well bore equipment.

8. The method according to claim 1, wherein the remote control/monitoring unit is located off-site relative to the well bore equipment.

9. The method according to claim 1, wherein:
    the wellbore equipment comprises an individual control system for operating the oil field tubular handling equipment, and
    if the parameter is not within predefined limits, then transmitting control data from the control/monitoring unit to the oil field tubular handling equipment for modifying the operation of the oil field tubular handling equipment so that the parameter will conform to the predefined limits or stopping operation of the wellbore equipment, comprises:
        if the parameter is not within predefined limits, then transmitting control data from the remote control/monitoring unit to the individual control system for modifying the operation of the oil field tubular handling equipment so that the parameter will conform to the predefined limits or stopping operation of the oil field tubular handling equipment.

10. The method according to claim 1, further comprising operating the oil field tubular handling equipment, thereby rotating a first threaded tubular member relative to a second threaded tubular member.

11. The method according to claim 10, wherein the tubular members are casing.

12. The method according to claim 11, wherein the parameter is turns measured at the shoulder condition and the method further comprises stopping operation of the oil field tubular handling equipment when reaching a predetermined turns value from the parameter.

13. The method according to claim 10, wherein the two threaded tubular members define a shoulder and the method further comprises detecting a shoulder condition during rotation of the first threaded tubular member by calculating and monitoring a rate of change in torque with respect to rotation.

14. The method according to claim 1, wherein the at least one parameter is a first parameter and a second parameter, the first parameter is torque, and the second parameter is turns.

15. A rig control and monitoring system comprising:
    at least one piece of mechanized oil field tubular handling equipment, comprising at least one of a torque sensor module and a turn counter sensor module; and
    a remote control/monitoring unit connected with the oil field tubular handling equipment by a communication link, wherein the control/monitoring unit comprises a display means and/or a storage means.

16. The rig control and monitoring system according to claim 15, wherein the mechanized oil field tubular handling equipment is tubing or casing tongs, drill pipe tongs, remote operated tongs, tong position systems, make-up and break out tools, a system for automatic tubular handling and running, slips, or spiders.

17. The rig control and monitoring system according to claim 15, wherein the remote control/monitoring unit is located off-site relative to the oil field tubular handling equipment.

18. The rig control and monitoring system according to claim 15, wherein the remote control/monitoring unit is located on-site relative to the oil field tubular handling equipment.

19. The rig control and monitoring system according to claim 15, wherein the remote control/monitoring unit is a computer.

20. The rig control and monitoring system according to claim 15, wherein oil field tubular handling equipment at multiple locations is connected to the remote control/monitoring unit.

21. The rig control end monitoring system according to claim 15, wherein the communication link is a high data rate communication link.

22. The rig control and monitoring system according to claim 15, wherein the communication link is a radio transmission link, fiber optic communication link, or bus link.

23. The rig control and monitoring system according to claim 22, wherein the communication link is the bus link and the bus link is ethernet, field bus, RS232, or RS485.

24. The rig control and monitoring system according to claim 23, wherein the bus link is the ethernet and the ethernet is a TCP/IP connection.

25. The rig control and monitoring system according to claim 15, wherein the communication link is fully duplexed.

26. The rig control and monitoring system according to claim 15, wherein the remote control/monitoring unit further comprises a programmable logic control device.

27. The rig control and monitoring system according to claim 15, wherein the remote control/monitoring unit comprises at least one evaluation module to evaluate received data and to display the received data as a graph, table, or bar.

28. The rig control and monitoring system according to claim 15, further comprising a local control/monitoring unit connected to the oil field tubular handling equipment with a second communication link.

29. The rig control and monitoring system according to claim 15, wherein the oil field tubular handling equipment further comprises an individual control system for operating the oil field tubular handling equipment and the communication link connects the remote control/monitoring unit with the individual control system.

30. The rig control and monitoring system according to claim 15, wherein the oil field tubular handling equipment comprises the torque sensor module and the turn counter sensor module.

31. A method for remotely controlling and/or monitoring at least one parameter of well born equipment at an oil or gas well, comprising:
- collecting data corresponding to the at least one parameter by a sensor module monitoring the at least one parameter of the well bore equipment;
- transmitting the collected data to a remote control/monitoring unit via a communication link, wherein collected data is transmitted from sensor modules at multiple locations to the remote control/monitoring unit and the data is stored from all sensor modules to provide a complete make-up history of all well bore equipment;
- analyzing the collected data to determine if the parameter is within predefined limits;
- if the parameter is not within predefined limits, then transmitting control data from the remote control/monitoring unit to the well bore equipment for modifying the operation of the well bore equipment so that the parameter will conform to the predefined limits or stopping operation of the well bore equipment.

32. A method for remotely controlling and/or monitoring at least one parameter of well bore equipment at an oil or gas well, comprising:
- collecting data corresponding to the at least one parameter by a sensor module monitoring the at least one parameter of the well bore equipment, wherein the wellbore equipment comprises an individual control system for operating the well bore equipment;
- transmitting the collected data to a remote control/monitoring unit via a communication link;
- analyzing the collected data to determine if the parameter is within predefined limits;
- if the parameter is not within predefined limits, then transmitting control data from the remote control/monitoring unit to the individual control system for modifying the operation of the well bore equipment so that the parameter will conform to the predefined limits or stopping operation of the well bore equipment.

33. A rig control and monitoring system comprising:
- at least one piece of mechanized well bore equipment, comprising a sensor module;
- a remote control/monitoring unit connected with the well bore equipment by a communication link, wherein the control/monitoring unit comprises a display means and/or a storage means; and
- a local control/monitoring unit connected to the well bore equipment with a second communication link.

34. A rig control and monitoring system comprising:
- at least one piece of mechanized well bore equipment, comprising a sensor module and an individual control system for operating the well bore equipment; and
- a remote control/monitoring unit connected with the well bore equipment by a communication link.

wherein:
- the control/monitoring unit comprises a display means and/or a storage means, and
- the communication link connects the remote control/monitoring unit with the individual control system.

35. A method for remotely controlling and/or monitoring oil field tubular handling equipment at an oil or gas well, comprising:
- collecting data corresponding to at least one parameter selected from a group consisting of torque and turns by a sensor module monitoring operation of the oil field tubular handling equipment,
- transmitting the collected data to a remote control/monitoring unit via a communication link; and
- analyzing the collected data to determine if the parameter is within predefined limits.

* * * * *